April 17, 1951     C. E. HALE     2,549,194

CHECK ARM STRUCTURE

Filed April 11, 1949

INVENTOR.
CLIFFORD E. HALE
BY Whittemore,
Hulbert & Belknap
ATTORNEYS

Patented Apr. 17, 1951

2,549,194

UNITED STATES PATENT OFFICE 2,549,194

CHECK ARM STRUCTURE

Clifford E. Hale, Ann Arbor, Mich., assignor to Detroit Harvester Company, Detroit, Mich., a corporation of Michigan Application April 11, 1949, Serial No. 86,717

13 Claims. (Cl. 287—99)

The present invention relates to check arm structure and more particularly to structure comprising a pair of pivoted arms including manual releasable locking means for retaining the arms in predetermined angular position.

The check arm structure is capable of general application and may be used for retaining lids or covers in elevated position or for retaining doors in open position. Specifically, the check arm structure may be used for retaining the cover or lid of storage compartments in automobiles in elevated position, or in conjunction with the tail gates of station wagons.

It is an object of the present invention to provide check arm structure designed to lock automatically when its arms are in predetermined angular position and to require manual release to move the arms from locked position.

It is a further object of the present invention to provide a check arm structure characterized by its simplicity, the economy with which it may be produced, the small number of parts required, and efficiency in operation.

It is a feature of the present invention to provide a check arm structure comprising essentially a pair of arms pivoted together at their ends and provided with slots adapted to register or come into alignment when the arms are in predetermined angular position, in combination with a lock pin and resilient means for urging the lock pin into locking position in the slots.

More specifically, it is an object of the present invention to provide a check arm structure comprising a pair of pivoted arms, a cover bracket pivoted to one of the arms, the arms being provided with alignable slots adjacent their pivot connection, a locking pin carried by the cover bracket in position to enter the slots when the slots are in alignment, and resilient means urging the cover bracket in a direction to cause the locking pin to enter the slots.

Other objects and features of the invention will become apparent as the description proceeds, especially when taken in conjunction with the accompanying drawings in which.

Figure 1:
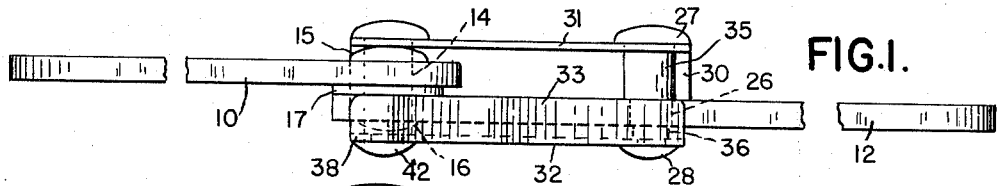
Figure 1 is a plan view of the check arm structure with the arms in extended position.

The check arm structure comprises a first arm 10 and a second arm 12, each of which is provided adjacent its free end with openings 13 for connecting the check arm structure to the mechanism with which it is associated. This mechanism may be the closure of a receptacle such for example as the lid of a rear deck of a motor vehicle, the tail gate of a station wagon, or the like.

Arms 10 and 12 are interconnected by pivot means indicated at 14, this means being herein illustrated as a rivet having heads 15 and 16. Intermediate the arms 10 and 12 is a washer or spacer indicated at 17. The arms 10 and 12 are preferably formed of flat metal stock and are widened adjacent their interconnected ends as well indicated in Figure 2. The pivot connection 14 is provided between the arms 10 and 12 adjacent the ends thereof and also adjacent the corresponding sides thereof. The end of the arm 10 is rounded as indicated at 18 to provide a cam surface for a purpose which will subsequently appear. In addition, the arm 10 is provided with a slot or recess 20 at the edge thereof opposite to the pivot connection 14.

The arm 12 is provided with a slot or recess 22 at its pivoted end at the edge opposite to the pivot connection 14. When the arms 10 and 12 are in extended position, that is, in alignment and extending in opposite directions from the pivot connection 14, the slots 20 and 22 are in registration or alignment.

Figure 3:
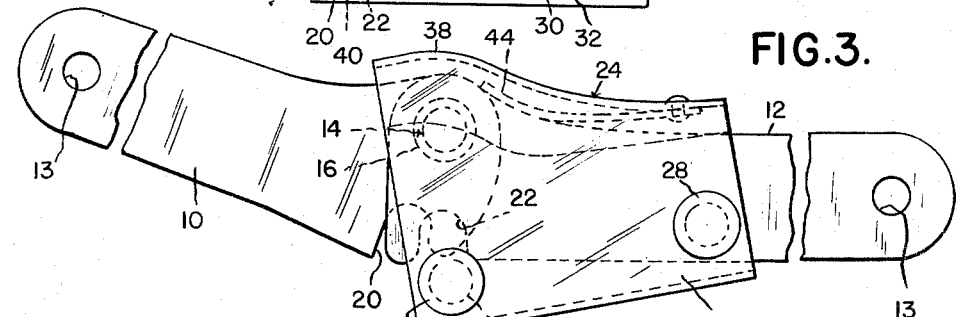
Figure 3 is a view similar to Figure 2 showing the arms moved slightly out of alignment.
Figure 4:
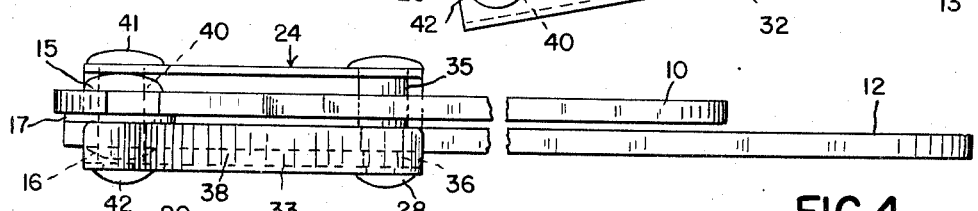
Figure 4 is a plan view of the check arm structure with one of the arms pivoted through an arc of substantially 180 degrees from the position shown in Figure 1.

A cover bracket 24 is secured to the arm 12 by a pivot connection indicated at 26, this pivot connection being constituted by a rivet having heads 27 and 28. The cover bracket 24 comprises a bottom portion 30, side portions 31 and 32, and a top portion 33. The top portion 33 is spaced from the side portion 31 to provide a space therebetween to permit movement of the arm 10 to the folded position indicated in Figure 5. Spacers 35 and 36 located on pivot pin 26 are provided intermediate the arm 12 and the side portions 31 and 32 respectively of the cover bracket. As best seen in Figure 3, the side portions of the cover bracket 24 are shaped so as to provide a widened portion 38 to accommodate the widened end portion of the arm 12 as the arms are moved from extended to folded position.

Extending between side portions 31 and 32 of the cover bracket 24 is a locking pin 40 having rivet heads 41 and 42. Resilient means illustrated herein as a leaf spring 44 are provided intermediate the cover bracket 24 and the arm 12 in position to urge the locking pin 40 into locking position in the slots 20 and 22.

It will be observed that the slots 20 and 22 are each disposed substantially radially with respect to the pivot axis of the pivot connection 14. Moreover, the locking pin 40 is mounted for movement substantially radially with respect to the axis of the pivot connection 14.

Figure 2:
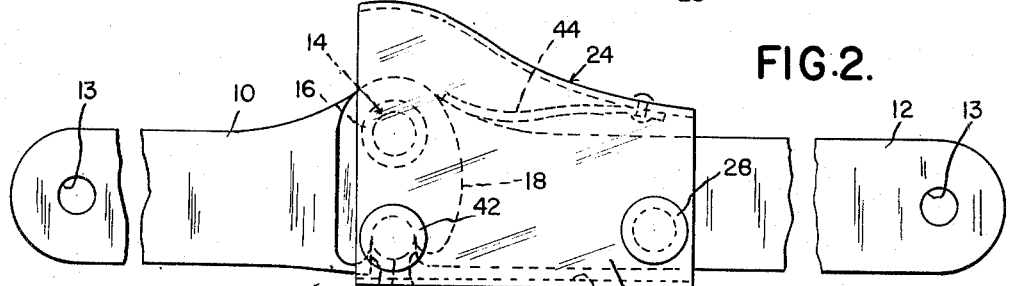
Figure 2 is a side elevation of the structure shown in Figure 1.
Figure 5:
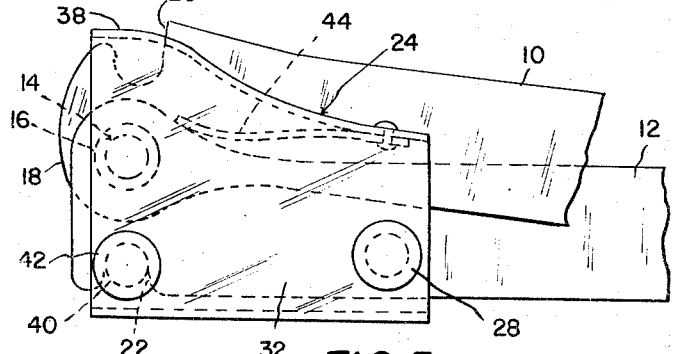
Figure 5 is a side elevation of the structure shown in Figure 4.

With the parts in the extended relation illustrated in Figure 2 it will be observed that the locking pin 40 effectively prevents relative rotation between the arms 10 and 12 about their pivot connection 14 and that the pin 40 is in shear, thus providing a very strong lock. If it is desired to fold the arms to the position illustrated in Figure 5, manual pressure is applied to the widened portion 38 of the cover bracket. It will be observed that the top portion 33 of the cover bracket presents a relatively wide smooth surface through which manual pressure may conveniently be applied. Manual pressure applied to the cover bracket 24 causes deflection of the spring 44 and moves the pin 40 out of the registry of slots 20 and 22 and continued application of pressure is in a direction to cause relative pivotal movement of the arms 10 and 12 about the pivot connection 14. As soon as the parts have reached the position illustrated in Figure 3 the pin 40 is retained in its released position by engagement with the rounded end portion 18 of the arm 10, thus the arms may be relatively moved until they reach the folded position illustrated in Figure 5. At this time, due to the shape of the camming surface 18, the camming surface is out of contact with the locking pin 40 as indicated in Figure 5. If it is desired to extend the arms and cause them to assume a locked condition, it is necessary only to provide for relative swinging movement between the arms. This initially brings the camming surface 18 into contact with the locking pin 40 and biases the pin out of the slot 22 in the arm 12. As soon as the slots 20 and 22 come into alignment the cover bracket 24 is urged by the spring 44 to carry the locking pin 40 into the aligned slots and thus lock the arms into extended position.

While the illustrated embodiment of the invention provides only a single locking recess 20 in the arm 10, it will of course be apparent that if desired one or more additional slots could be provided so that the arms 10 and 12 could be rigidly locked in different angular relationship; however, for most purposes a single lock position is all that is required.

It will be observed that the self-locking manual releasable check arm structure is provided with a minimum of easily constructed parts. The arms 10 and 12 are formed of flat stock easily machined to the required configuration. The pivot pins and the locking pins are rivets which may be applied with a minimum of difficulty. The cover bracket is formed of sheet metal and may be relatively light gauge since it is not subjected to any particular stress when the locking pin 40 is in locking position.

The structure is extremely simple in operation requiring only the application of pressure to the cover bracket to first move the locking pin out of the aligned slots and thereafter to cause relative pivotal movement between the arms 10 and 12. As the arms 10 and 12 reach the extended position shown in Figure 2, the spring 44 forces the pin 40 into the aligned slots so that the structure is self-locking in extended position.

The drawings and the foregoing specification constitute a description of the improved check arm structure in such full, clear, concise and exact terms as to enable any person skilled in the art to practice the invention, the scope of which is indicated by the appended claims.

What I claim as my invention is:

1. Check arm structure comprising a pair of arms, pivot means interconnecting the ends of said arms, said arms having slots adjacent said pivot means alignable when said arms are disposed in predetermined angular relation to each other, a locking pin carried by one of said arms positioned to enter said slots when they are in alignment, and resilient means urging said locking pin in a direction to enter said slots.

2. Check arm structure comprising a pair of arms, pivot means interconnecting the ends of said arms, said arms having slots adjacent said pivot means alignable when said arms are disposed in predetermined angular relation to each other, a locking pin carried by one of said arms positioned to enter said slots when they are in alignment, resilient means urging said locking pin in a direction to enter said slots, a bracket on which said locking pin is secured, and pivot means connecting said bracket to one of said arms.

3. Check arm structure comprising a pair of arms, pivot means interconnecting the ends of said arms, said arms having slots adjacent said pivot means alignable when said arms are disposed in predetermined angular relation to each other, a locking pin carried by one of said arms positioned to enter said slots when they are in alignment, and resilient means urging said locking pin in a direction to enter said slots, a cover bracket on which said locking pin is secured, and pivot means connecting said bracket to one of said arms, said resilient means comprising a spring interposed between said one arm and said cover bracket.

4. Check arm structure comprising a pair of arms, pivot means interconnecting the ends of said arms, said arms having slots adjacent said pivot means alignable when said arms are disposed in predetermined angular relation to each other, a locking pin carried by one of said arms positioned to enter said slots when they are in alignment, and resilient means urging said locking pin in a direction to enter said slots, the end of said other arm being curved to provide a cam surface effective to move said locking pin out of the slot in said one arm, as the arms are moved to bring the slots into alignment.

5. Check arm structure comprising a pair of flat arms, pivot means interconnecting said arms adjacent the ends thereof, a cover bracket formed of sheet metal having top, bottom and side portions and pivotally connected to one of said arms, the top portion of said bracket being spaced from one side portion to provide space for swinging movement of said other arm relative to said one arm, the pivoted ends of said arms having slots therein alignable when said arms are in predetermined angular relation, a lock pin extending between opposite side portions of said bracket and positioned to enter said slots, and resilient means intermediate said one arm and said bracket urging said bracket toward locking position.

6. Check arm structure comprising a pair of flat arms, pivot means interconnecting said arms adjacent the ends thereof, a cover bracket formed of sheet metal having top, bottom and side portions and pivotally connected to one of said arms, the top portion of said bracket being spaced from one side portion to provide space for swinging movement of said other arm relative to said one arm, the pivoted ends of said arms having slots therein alignable when said arms are in predetermined angular relation, a lock pin extending between opposite side portions of said bracket and positioned to enter said slots, and a leaf spring intermediate said one arm and said bracket urging said bracket toward locking position.

7. Check arm structure comprising a pair of flat arms, pivot means interconnecting said arms adjacent the ends thereof, a cover bracket formed of sheet metal having top, bottom and side portions and pivotally connected to one of said arms, the top portion of said bracket being spaced from one side portion to provide space for swinging movement of said other arm relative to said one arm, the pivoted ends of said arms having slots therein alignable when said arms are in predetermined angular relation, a lock pin extending between opposite side portions of said bracket and positioned to enter said slots, and resilient means intermediate said one arm and said bracket urging said bracket toward locking position, the end of said other arm having a rounded end providing a camming surface for engagement with said locking pin when the slots are out of alignment.

8. Check arm structure comprising a pair of flat arms, pivot means interconnecting said arms adjacent their ends and adjacent the edges thereof, said arms having slots at the said ends at the opposite edges thereof in alignment with each other when said arms are extended, a locking pin carried by one of said arms, and resilient means urging said pin into locking position in said slots.

9. Check arm structure comprising a pair of flat arms, pivot means interconnecting said arms adjacent their ends and adjacent the edges thereof, said arms having slots at the said ends at the opposite edges thereof in alignment with each other when said arms are extended, a locking pin carried by one of said arms, resilient means urging said pin into locking position in said slots, and a cover bracket substantially surrounding the pivot connection between said arms.

10. Check arm structure comprising a pair of flat arms, pivot means interconnecting said arms adjacent their ends and adjacent the edges thereof, said arms having slots at the said ends at the opposite edges thereof in alignment with each other when said arms are extended, a locking pin carried by one of said arms, resilient means urging said pin into locking position in said slots, and a cover bracket substantially surrounding the pivot connection between said arms, said cover bracket being pivotally secured to one of said arms, and said locking pin being carried by said cover bracket.

11. Check arm structure comprising a pair of flat arms, pivot means interconnecting said arms adjacent their ends and adjacent the edges thereof, said arms having slots at the said ends at the opposite edges thereof in alignment with each other when said arms are extended, a locking pin carried by one of said arms, resilient means urging said pin into locking position in said slots, and a cover bracket substantially surrounding the pivot connection between said arms, said cover bracket being pivotally secured to one of said arms, and said locking pin being carried by said cover bracket, said cover bracket having a flattened edge portion to which manual pressure may be applied to move said locking pin out of locking position in the slots in said arms.

12. Check arm structure comprising a pair of flat arms, pivot means interconnecting said arms adjacent their ends and adjacent the edges thereof, said arms having slots at the said ends at the opposite edges thereof in alignment with each other when said arms are extended, a locking pin carried by one of said arms, and resilient means urging said pin into locking position in said slots, said slots being disposed substantially radially of the axis of said pivot means, and said locking pin being mounted for movement substantially radially of the axis of said pivot means.

13. Check arm structure comprising a pair of arms, pivot means interconnecting the ends of said arms, said arms having slots adjacent said pivot means alignable when said arms are disposed in predetermined angular relation to each other, a locking pin carried by one of said arms positioned to enter said slots when they are in alignment, and resilient means urging said locking pin in a direction to enter said slots, the end of said other arm being curved to provide a cam surface having a portion adjacent the slot in said other arm shaped to retain said pin against re-entry into the slot in said one arm while said arms are displaced a small amount from said predetermined angular relation, said cam surface having a portion spaced from the slot in said other arm shaped to permit re-entry of said pin into the slot in said one arm as said arms are displaced further from said predetermined angular relation, said cam surface being effective to cam said pin out of the slot in said one arm as said arms are relatively moved into said predetermined angular relation.

CLIFFORD E. HALE.

REFERENCES CITED

The following references are of record in the file of this patent:

UNITED STATES PATENTS

| Number | Name | Date |
|---|---|---|
| 1,750,213 | Collins | Mar. 11, 1930 |
| 2,108,774 | Lipert | Feb. 15, 1938 |